United States Patent
Dubey et al.

(10) Patent No.: US 11,153,122 B2
(45) Date of Patent: Oct. 19, 2021

(54) PROVIDING STATEFUL SERVICES DEPLOYED IN REDUNDANT GATEWAYS CONNECTED TO ASYMMETRIC NETWORK

(71) Applicant: Nicira, Inc., Palo Alto, CA (US)

(72) Inventors: Ankur Dubey, Santa Clara, CA (US); Sami Boutros, Union City, CA (US); Vijayalaxmi Basavaraj, Cupertino, CA (US); Yashika Narang, Sunnyvale, CA (US); Sharath Bhat, Santa Clara, CA (US)

(73) Assignee: NICIRA, INC., Palo Alto, CA (US)

(*) Notice: Subject to any disclaimer, the term of this patent is extended or adjusted under 35 U.S.C. 154(b) by 0 days.

(21) Appl. No.: 15/899,323

(22) Filed: Feb. 19, 2018

(65) Prior Publication Data
US 2019/0260610 A1    Aug. 22, 2019

(51) Int. Cl.
*H04L 12/66*    (2006.01)
*H04L 12/26*    (2006.01)
(Continued)

(52) U.S. Cl.
CPC .......... *H04L 12/66* (2013.01); *H04L 43/0817* (2013.01); *H04L 67/32* (2013.01); *H04L 12/4633* (2013.01); *H04L 69/40* (2013.01)

(58) Field of Classification Search
CPC ... H04L 12/4633; H04L 45/586; H04L 67/34; H04L 69/40; H04L 45/745; H04L 12/66;
(Continued)

(56) References Cited

U.S. PATENT DOCUMENTS

| 5,204,966 A | 4/1993 | Wittenberg et al. |
| 5,900,025 A | 5/1999 | Sollars |

(Continued)

FOREIGN PATENT DOCUMENTS

| CN | 101641912 A | 2/2010 |
| CN | 103181131 A | 6/2013 |

(Continued)

OTHER PUBLICATIONS

NPL Author Unknown, "Enabling Service Chaining on Cisco Nexus 1000V Series," Month Unknown, 2012, 25 pages, CISCO.
NPL Aversa, Luis, et al., "Load Balancing a Cluster of Web Servers Using Distributed Packet Rewriting," Computer Science Department Technical Report, Jan. 6, 1999, 13 pages, Boston University, Boston, MA, USA.

(Continued)

*Primary Examiner* — Yemane Mesfin
*Assistant Examiner* — Mon Cheri S Davenport
(74) *Attorney, Agent, or Firm* — Adeli LLP

(57) ABSTRACT

For a set of gateway devices at the edge of a logical network, some embodiments provide a method for ensuring that data messages from an external network requiring a stateful service are received at an active gateway device. The method advertises the availability of a set of internet protocol (IP) addresses from standby gateway devices with a higher cost than the cost advertised by an active gateway device. In some embodiments, the advertisement is made using a border gateway protocol. Data messages may be unexpectedly received on a standby node despite the higher advertised cost. This could happen due to asymmetric network failures. The method determines if a stateful service is needed for the data messages received on standby node. Based on the determination, the method forwards the received data message to the active gateway device for the active gateway device to provide the stateful service.

20 Claims, 7 Drawing Sheets

(51) Int. Cl.
*H04L 29/08* (2006.01)
*H04L 29/14* (2006.01)
*H04L 12/46* (2006.01)

(58) Field of Classification Search
CPC . H04L 45/44; H04L 41/0654; H04L 41/5041; H04L 41/5077; H04L 45/122; H04L 45/22; H04L 45/28; H04L 45/306; H04L 45/42; H04L 45/64; H04L 45/72; H04L 49/354; H04L 49/70; H04L 67/1095; H04L 67/327; H04L 61/2007; H04L 63/101; H04L 67/1023; H04L 67/1027; H04L 63/0218; H04L 63/0254; H04L 67/1002; H04L 29/12783; H04L 67/1008; H04L 67/1036; H04L 67/1025; H04L 67/1029; H04L 67/2814; H04L 63/0272; H04L 63/0227; H04L 63/08; H04L 41/0893; G06F 11/0709; G06F 11/079; G06F 11/0793; G06F 9/54; G06F 9/505; G06F 11/2007; H04M 15/66; H04W 4/24; G06Q 30/02
See application file for complete search history.

(56) References Cited

U.S. PATENT DOCUMENTS

| | | | |
|---|---|---|---|
| 6,108,308 A | 8/2000 | Flavin et al. | |
| 6,687,245 B2 | 2/2004 | Fangman et al. | |
| 7,120,693 B2 | 10/2006 | Chang et al. | |
| 7,146,421 B2 | 12/2006 | Syvanne | |
| 7,277,401 B2 | 10/2007 | Kyperountas et al. | |
| 7,561,515 B2 | 7/2009 | Ross | |
| 7,724,670 B2 | 5/2010 | Nilakantan et al. | |
| 7,760,640 B2 | 7/2010 | Brown et al. | |
| 7,765,312 B2 | 7/2010 | Monette et al. | |
| 7,778,194 B1 | 8/2010 | Yung | |
| 7,818,452 B2 | 10/2010 | Matthews et al. | |
| 7,826,390 B2 | 11/2010 | Noel et al. | |
| 7,881,215 B1 | 2/2011 | Daigle et al. | |
| 7,948,986 B1 | 5/2011 | Ghosh et al. | |
| 8,005,770 B2 | 8/2011 | Minh et al. | |
| 8,190,767 B1 | 5/2012 | Maufer et al. | |
| 8,261,317 B2 | 9/2012 | Litvin et al. | |
| 8,300,532 B1 | 10/2012 | Venkatramani et al. | |
| 8,316,113 B2 | 11/2012 | Linden et al. | |
| 8,339,994 B2 | 12/2012 | Gnanasekaran et al. | |
| 8,369,323 B1 | 2/2013 | Desai | |
| 8,370,936 B2 | 2/2013 | Zuk et al. | |
| 8,553,552 B2 | 10/2013 | Hu et al. | |
| 8,625,426 B2 | 1/2014 | Strulo et al. | |
| 8,711,703 B2 | 4/2014 | Allan et al. | |
| 8,713,663 B2 | 4/2014 | An | |
| 8,737,221 B1 | 5/2014 | Jilani et al. | |
| 8,811,401 B2 | 8/2014 | Stroud et al. | |
| 8,830,834 B2 | 9/2014 | Sharma et al. | |
| 8,897,132 B2 | 11/2014 | Feroz et al. | |
| 8,937,865 B1 | 1/2015 | Kumar et al. | |
| 8,942,238 B2 | 1/2015 | Kano et al. | |
| 9,110,864 B2 | 8/2015 | Jamjoom et al. | |
| 9,137,052 B2 | 9/2015 | Koponen et al. | |
| 9,231,871 B2 | 1/2016 | Mehta et al. | |
| 9,270,521 B2 | 2/2016 | Tompkins | |
| 9,282,027 B1 | 3/2016 | Brandwine et al. | |
| 9,317,469 B2 | 4/2016 | Gross et al. | |
| 9,349,135 B2 | 5/2016 | Sarshar | |
| 9,374,337 B2 | 6/2016 | Rangaraman et al. | |
| 9,391,859 B2 | 7/2016 | Huang et al. | |
| 9,401,818 B2 | 7/2016 | Venkatesh | |
| 9,450,862 B2 | 9/2016 | Chen et al. | |
| 9,497,281 B2 | 11/2016 | Jagadish et al. | |
| 9,825,810 B2 | 11/2017 | Jain et al. | |
| 9,866,473 B2 | 1/2018 | Parsa et al. | |
| 9,876,714 B2 | 1/2018 | Parsa et al. | |
| 10,044,617 B2 | 8/2018 | Parsa et al. | |
| 10,390,290 B1 | 8/2019 | Zhang et al. | |
| 2003/0093481 A1 | 5/2003 | Mitchell et al. | |
| 2003/0154399 A1 | 8/2003 | Zuk et al. | |
| 2004/0018839 A1 | 1/2004 | Andric et al. | |
| 2004/0197079 A1 | 10/2004 | Latvala et al. | |
| 2005/0063324 A1 | 3/2005 | O'Neill et al. | |
| 2005/0220098 A1 | 10/2005 | Oguchi et al. | |
| 2006/0176882 A1 | 8/2006 | Schein et al. | |
| 2006/0193247 A1* | 8/2006 | Naseh | H04L 45/04 370/216 |
| 2007/0061492 A1 | 3/2007 | van Riel | |
| 2007/0180226 A1 | 8/2007 | Schory et al. | |
| 2007/0201357 A1 | 8/2007 | Smethurst et al. | |
| 2008/0072305 A1 | 3/2008 | Casado et al. | |
| 2008/0098113 A1 | 4/2008 | Hansen et al. | |
| 2008/0259938 A1 | 10/2008 | Keene et al. | |
| 2009/0016354 A1 | 1/2009 | Isobe | |
| 2009/0097406 A1 | 4/2009 | Nilakantan et al. | |
| 2009/0129271 A1 | 5/2009 | Ramankutty et al. | |
| 2009/0193122 A1 | 7/2009 | Krishamurthy | |
| 2009/0199268 A1 | 8/2009 | Ahmavaara et al. | |
| 2009/0235325 A1 | 9/2009 | Dimitrakos et al. | |
| 2010/0046530 A1 | 2/2010 | Hautakorpi et al. | |
| 2010/0097931 A1 | 4/2010 | Mustafa | |
| 2010/0100616 A1 | 4/2010 | Bryson et al. | |
| 2010/0271964 A1 | 10/2010 | Akhter et al. | |
| 2010/0302940 A1 | 12/2010 | Patel et al. | |
| 2011/0013639 A1 | 1/2011 | Matthews et al. | |
| 2011/0026537 A1 | 2/2011 | Kolhi et al. | |
| 2011/0213888 A1 | 9/2011 | Goldman et al. | |
| 2012/0106560 A1 | 5/2012 | Gumaste | |
| 2012/0131216 A1 | 5/2012 | Jain et al. | |
| 2012/0216282 A1 | 8/2012 | Pappu et al. | |
| 2012/0250682 A1 | 10/2012 | Vincent et al. | |
| 2012/0258712 A1 | 10/2012 | Rozinov | |
| 2013/0007740 A1 | 1/2013 | Kikuchi et al. | |
| 2013/0073743 A1 | 3/2013 | Ramasamy et al. | |
| 2013/0121209 A1 | 5/2013 | Padmanabhan et al. | |
| 2013/0155902 A1 | 6/2013 | Feng et al. | |
| 2013/0163594 A1 | 6/2013 | Sharma et al. | |
| 2013/0174177 A1 | 7/2013 | Newton et al. | |
| 2013/0201989 A1 | 8/2013 | Hu et al. | |
| 2013/0227550 A1 | 8/2013 | Weinstein et al. | |
| 2013/0239198 A1 | 9/2013 | Niemi | |
| 2013/0254085 A1 | 9/2013 | Tanimoto et al. | |
| 2013/0329584 A1 | 12/2013 | Ghose et al. | |
| 2013/0332983 A1 | 12/2013 | Koorevaar et al. | |
| 2013/0336337 A1 | 12/2013 | Gopinath et al. | |
| 2014/0050091 A1 | 2/2014 | Biswas et al. | |
| 2014/0068602 A1 | 3/2014 | Gember et al. | |
| 2014/0092906 A1 | 4/2014 | Kandaswamy et al. | |
| 2014/0115578 A1 | 4/2014 | Cooper et al. | |
| 2014/0195666 A1 | 7/2014 | Dumitriu et al. | |
| 2014/0198649 A1 | 7/2014 | Jain et al. | |
| 2014/0269733 A1 | 9/2014 | Venkatesh | |
| 2014/0297964 A1 | 10/2014 | Nakase | |
| 2014/0301388 A1 | 10/2014 | Jagadish et al. | |
| 2014/0304399 A1 | 10/2014 | Chaudhary et al. | |
| 2014/0310418 A1 | 10/2014 | Christopher et al. | |
| 2014/0323127 A1 | 10/2014 | Evans et al. | |
| 2014/0380087 A1 | 12/2014 | Jamjoom et al. | |
| 2015/0106420 A1 | 4/2015 | Warfield et al. | |
| 2015/0146539 A1 | 5/2015 | Mehta et al. | |
| 2015/0263899 A1 | 9/2015 | Tubaltsev et al. | |
| 2015/0312155 A1 | 10/2015 | Anand et al. | |
| 2016/0006654 A1 | 1/2016 | Fernando et al. | |
| 2016/0028630 A1 | 1/2016 | Wells | |
| 2016/0028855 A1 | 1/2016 | Goyal et al. | |
| 2016/0043901 A1 | 2/2016 | Sankar et al. | |
| 2016/0065479 A1 | 3/2016 | Harper et al. | |
| 2016/0080261 A1 | 3/2016 | Koponen et al. | |
| 2016/0119229 A1 | 4/2016 | Zhou | |
| 2016/0119236 A1 | 4/2016 | Decusatis et al. | |
| 2016/0142295 A1 | 5/2016 | Parsa et al. | |
| 2016/0142296 A1 | 5/2016 | Parsa et al. | |
| 2016/0142297 A1 | 5/2016 | Parsa et al. | |
| 2016/0142314 A1 | 5/2016 | Parsa et al. | |
| 2016/0226700 A1* | 8/2016 | Zhang | H04L 49/25 |

(56) References Cited

U.S. PATENT DOCUMENTS

| | | |
|---|---|---|
| 2016/0241669 A1 | 8/2016 | Oyon et al. |
| 2016/0308770 A1 | 10/2016 | Zhang et al. |
| 2016/0315814 A1 | 10/2016 | Thirumurthi et al. |
| 2017/0048136 A1 | 2/2017 | Williams |
| 2017/0085486 A1 | 3/2017 | Chung et al. |
| 2017/0150418 A1 | 5/2017 | Kim et al. |
| 2017/0195169 A1 | 7/2017 | Mills et al. |
| 2017/0257801 A1 | 9/2017 | Toth et al. |
| 2018/0248805 A1 | 8/2018 | Kamat et al. |
| 2018/0278541 A1 | 9/2018 | Wu et al. |
| 2019/0021029 A1 | 1/2019 | Rydnell et al. |
| 2019/0036815 A1 | 1/2019 | Kancherla et al. |
| 2019/0036819 A1 | 1/2019 | Kancherla et al. |
| 2019/0036881 A1 | 1/2019 | Kancherla et al. |

FOREIGN PATENT DOCUMENTS

| | | |
|---|---|---|
| CN | 103647656 A | 3/2014 |
| CN | 103701900 A | 4/2014 |
| CN | 103930882 B | 7/2014 |
| CN | 104022891 A | 9/2014 |
| EP | 1890438 | 2/2008 |
| WO | 2008095010 | 8/2008 |
| WO | 2016076900 | 5/2016 |

OTHER PUBLICATIONS

NPL Dixon, Colin, et al., "An End to the Middle," Proceedings of the 12th conference on Hot topics in operating systems USENIX Association, May, 2009, 5 pages, Berkeley, CA, USA.

NPL Guichard, J., et al., "Network Service Chaining Problem Statement," Network Working Group, Jun. 13, 2013, 14 pages, Cisco Systems, Inc.

NPL Joseph, Dilip, et al., "A Policy-aware Switching Layer for Date Centers," Jun. 24, 2008, 26 pages, Electrical Engineering and Computer Sciences, University of California, Berkeley, CA, USA.

NPL Koponen, Teemu, et al., "Network Virtualization in Multi-tenant Datacenters," Aug. 2013, 22 pages, VMware, Inc., Palo Alto, California, USA.

NPL Schroeder, Trevor, et al., "Scalable Web Server Clustering Technologies," IEEE Network, vol. 14, No. 3, May 1, 2000, 8 pages, IEEE Service Center, New York, NY, USA.

NPL Sekar, Vyas, et al., "Design and Implementation of a Consolidated Middlebox Architecture," 9th USENIX conference on Networked System Design and Implementation, Apr. 25-27, 2012, 14 pages.

NPL Sherry, Justine, et al., "Making Middleboxes Someone Else's Problem: Network Processing as a Cloud Service," SSIGCOMM, Aug. 13-17, 2012, 12 pages, ACM, Helsinki, Finland.

Harper, Matthew H., et al., U.S. Appl. No. 62/042,049, filed Aug. 26, 2014, 27 pages.

\* cited by examiner

PROVIDING STATEFUL SERVICES DEPLOYED IN REDUNDANT GATEWAYS CONNECTED TO ASYMMETRIC NETWORK

BACKGROUND

In a software defined network, a set of gateway devices (e.g., Edge Nodes) connecting the internal virtualized network and an external network may operate as redundant nodes with all but one gateway device acting as standby gateway devices. The other gateway device is designated as an active gateway that provides a set of stateful services for traffic between the internal and external networks. Standby gateway devices advertise availabilities of internet protocol (IP) addresses in the software defined network with higher cost than the active gateway device in order to direct all traffic to the active gateway device. It is important for the active gateway device to receive all the traffic requiring the stateful services in order to maintain complete and up-to-date state information for providing the stateful services.

For symmetric external networks that have equivalent connections to the standby and active gateway devices, advertising the availability of an IP address with higher cost than an active gateway device generally suffices to direct all traffic for that IP address to the active gateway device. However, for asymmetric external networks with non-equivalent connections to the active and standby gateway devices, traffic may be directed to a standby gateway device despite the higher advertised cost. Thus, a solution for providing stateful services for traffic received at a standby gateway is required.

BRIEF SUMMARY

For a set of gateway devices at the edge of a logical network, some embodiments provide a method for ensuring that data messages from an external network requiring a stateful service are received at an active gateway device. The method advertises the availability of a set of internet protocol (IP) addresses from standby gateway devices with a higher cost than the cost advertised by an active gateway device. In some embodiments, the advertisement is made using a border gateway protocol. The method then receives data messages for the advertised IP addresses at a standby device despite the higher advertised cost and determines that the received data message requires a stateful service that is provided by the set of gateway devices. Based on the determination, the method forwards the received data message to the active gateway device for the active gateway device to provide the stateful service.

In some embodiments, the standby gateway device receives the traffic requiring the stateful service based on an asymmetry in the external network. The asymmetry, in some embodiments, is based on the placement of the standby gateway device at a datacenter in a different geographical location.

The gateway devices, in some embodiments, implement a same logical router that provides the stateful services. The logical router, in some embodiments, uses policy-based routing to redirect data messages received at a standby gateway device to the active gateway device. In some embodiments, the policy-based routing is used to determine that the received data message requires the stateful service. When redirecting the data message, some embodiments use a tunnel established between the two gateway devices. In some embodiments, the active gateway receives the data message as if it was from the external network instead of the standby gateway device.

When an active gateway device fails, or is no longer the active gateway device for whatever reason, a gateway that was formerly a standby device becomes the active device. Once the newly-active device determines that it is the current active device, further messages received from the external network have the stateful service provided by the newly-active gateway device. As all the redirection happens within the software defined network, no restrictions or requirements are placed on the external networks.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

For a set of gateway devices at the edge of a logical network, some embodiments provide a method for ensuring that data messages from an external network requiring a stateful service are received at an active gateway device. The method advertises the availability of a set of internet protocol (IP) addresses from standby gateway devices with a higher cost than the cost advertised by an active gateway device. In some embodiments, the advertisement is made using a border gateway protocol. The method then receives data messages for the advertised IP addresses at a standby device despite the higher advertised cost and determines that the received data message requires a stateful service that is provided by the set of gateway devices. Based on the determination, the method forwards the received data message to the active gateway device for the active gateway device to provide the stateful service.

As used in this document, the term data packet, packet, data message, or message refers to a collection of bits in a particular format sent across a network. It should be understood that the term data packet, packet, data message, or message may be used herein to refer to various formatted collections of bits that may be sent across a network, such as Ethernet frames, IP packets, TCP segments, UDP datagrams, etc. While the examples below refer to data packets, packets, data messages, or messages, it should be understood that the invention should not be limited to any specific format or type of data message. Also, as used in this document, references to L2, L3, L4, and L7 layers (or layer 2, layer 3, layer 4, layer 7) are references to the second data link layer, the third network layer, the fourth transport layer, and the seventh application layer of the OSI (Open System Interconnection) layer model, respectively.

Figure 1:
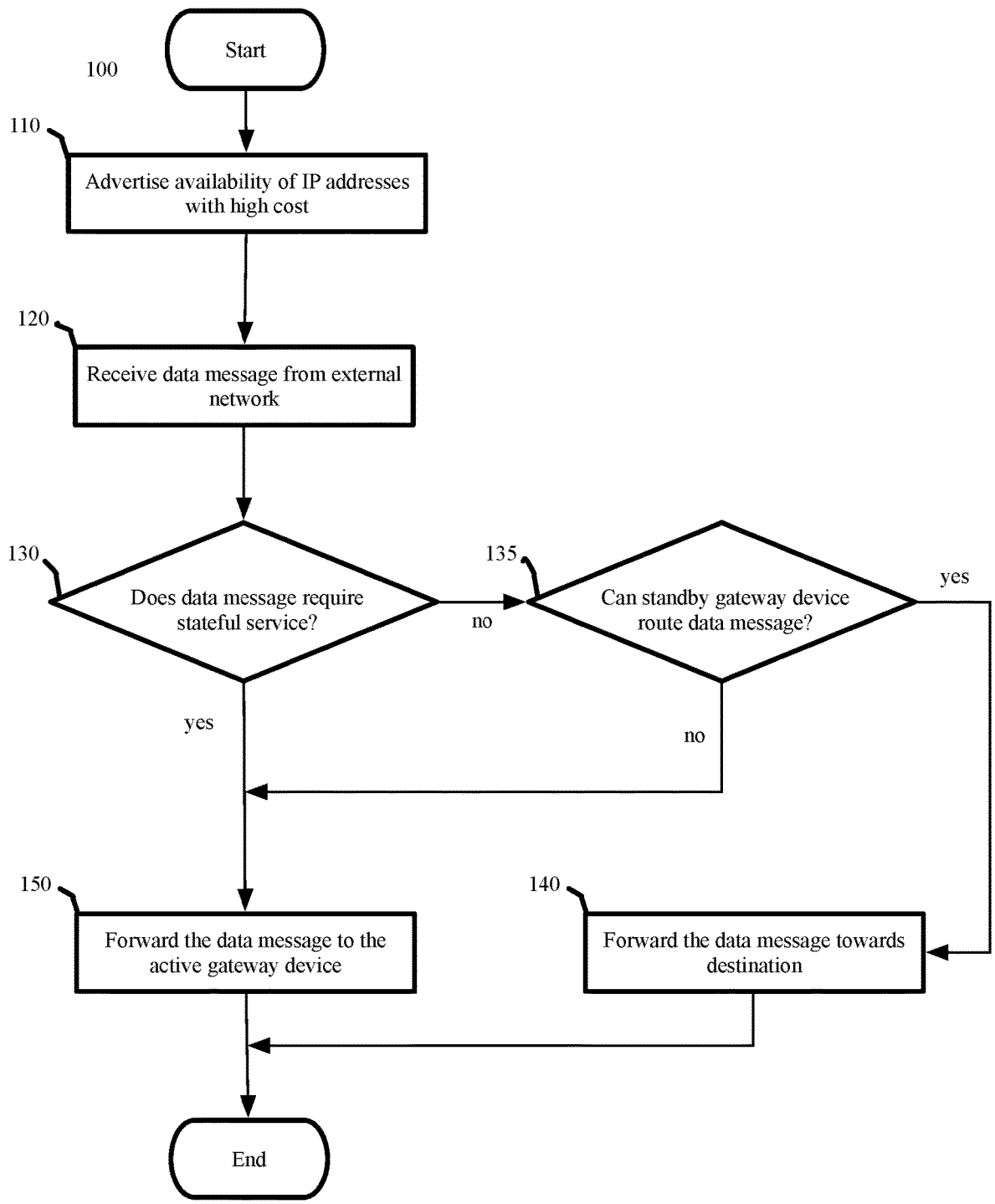
FIG. 1 conceptually illustrates a process for a standby gateway device to ensure that stateful services are provided at an active gateway device.

FIG. 1 conceptually illustrates a process 100 for a standby gateway device to ensure that stateful services are provided at an active gateway device. The process advertises (at 110) the availability of a set of IP addresses associated with a software defined network to an external network with a high cost. The advertised cost is higher than the cost associated with the active gateway device and, in some embodiments, the advertised cost is the highest cost allowed by the advertising protocol (e.g., border gateway protocol). In some embodiments, the set of IP addresses includes virtual IP addresses associated with a service or application that is provided by a set of computing devices (e.g., a web server application or database application executing on a set of servers). Particular IP addresses in the set of advertised addresses, in some embodiments, are associated with particular services. The particular services include stateful services (e.g., stateful load balancing, firewall, network address translation, virtual private network, etc.) in some embodiments.

The process then receives (at 120) a data message from an external network. In some embodiments, the data message is received at the standby gateway device based on an active gateway device being deemed unreachable by forwarding elements (e.g., switches, routers, etc.). An active gateway may be deemed unreachable based on its geographic location as described further with respect to FIG. 4. The data message is received at an uplink of the gateway device that connects to the external network and is destined for a computing device in the software defined network.

After the standby gateway device receives the data message, the process determines (at 130) whether the data message requires a stateful service. In some embodiments, the determination is based on data message headers such as a destination IP address (e.g., whether a destination IP address is an IP address associated with a stateful service). The determination is implemented, in some embodiments, by a policy-based routing rule that redirects data messages directed to IP addresses associated with stateful services to an active gateway device. The IP addresses associated with stateful services, in some embodiments, correspond to a range of IP addresses associated with a network for which the stateful service is required or with a set of particular IP address associated with modules providing stateful services. In some embodiments, the determination that a data message requires a stateful service is omitted and all data messages are forwarded to the active gateway device. In some embodiments, the policy-based routing entry identifies values in a combination of fields used to determine that a received data message should be forwarded to the MAC of the second interface from the first interface. The fields that may be used to specify data messages that should be forwarded to the MAC of the second interface from the first interface, in some embodiments, include a source IP address, destination IP address, source MAC address, destination MAC address, source port, destination port, and protocol.

If the process determines (at 130) that a stateful service is required, the process forwards (at 150) the data message to the active gateway device for the active gateway device to provide the service. The active gateway device, in some embodiments, receives the data message as if it is coming from the external network. In some embodiments, the data message is forwarded along a tunnel connecting the standby gateway device to the active gateway device. In some embodiments, the tunnel is established between the standby and active gateway devices using an uplink interface of the active gateway as one tunnel endpoint in order to ensure that the data message appears to come from the external network. Once the data message is forwarded the process ends.

If the process determines (at 130) that a stateful service is not required, the process makes an additional determination (at 135) as to whether the standby gateway device can route the data message. In some embodiments, for data messages that do not require stateful services, a standby gateway device can route the data message using the implementation of a distributed logical router executing on the standby gateway device. As long as the data message does not require a stateful service, the routing from the standby gateway device does not affect the function (i.e., state) of the stateful services and some embodiments allow the standby gateway device to provide routing services for the received data message. If the process determines (at 135) that the standby gateway device can forward the data message, the process forwards (at 140) the data message towards the destination indicated in the data message header. The process then ends.

If the process determines (at 135) that the standby gateway device cannot route the data message, the data message is forwarded to the active gateway device for the active gateway device to process and the process ends. A standby gateway device, in some embodiments, cannot forward the received data message because of a policy redirecting all data messages to the active gateway device. In other embodiments, particular IP addresses or subnets of IP addresses are designated as addresses that cannot be processed by any gateway device other than the active gateway device. The IP addresses, in some embodiments, are reflected in a further policy-based routing entry in the logical router implemented by the standby gateway device.

Figure 2:
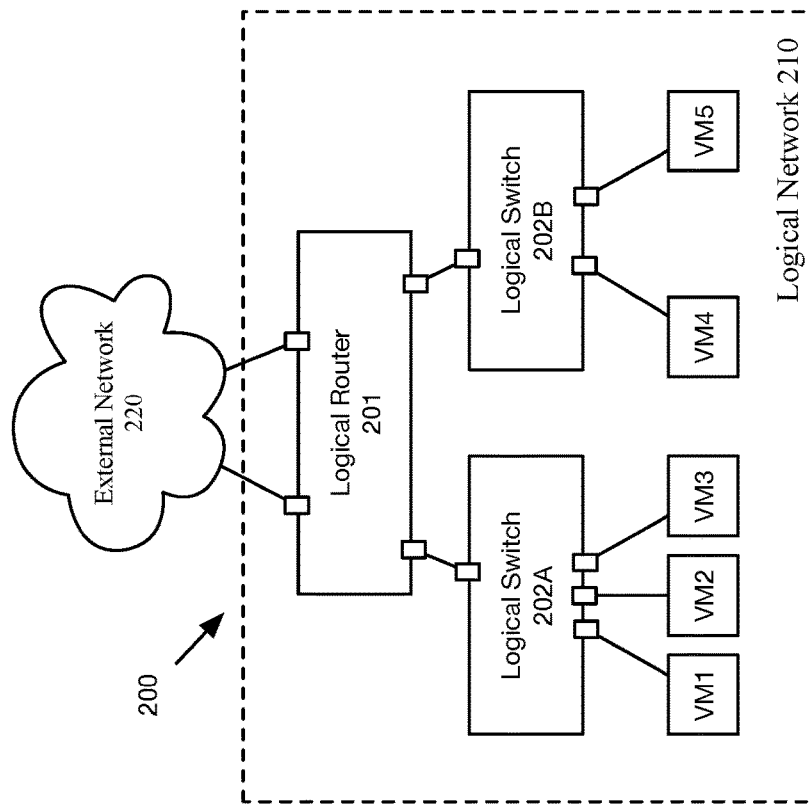
FIG. 2 conceptually illustrates a logical network implemented by a set of computing devices in datacenters.

FIG. 2 illustrates a configuration view 200 of a user-defined logical network (e.g., a software defined network). A user-defined logical network as used in this application, refers to a particular logical abstraction of a network. In some embodiments, the logical abstraction includes logical counterparts to network elements of a physical network such as forwarding elements (e.g., switches, hubs, routers, bridges, etc.), load balancers, and firewalls. The logical forwarding elements (e.g., a logical switch or logical router) in some embodiments are implemented by a set of MFEs (e.g., physical or virtual/software switches, or routers) executing on host machines. A particular host machine may host data compute nodes (DCNs) (e.g., containers or virtual machines (VMs)) connected to multiple different logical networks and the set of MFEs implements all the logical networks to which the DCNs logically connect.

Configuration view 200 represents a logical network as designed by a user. As shown, the logical router 201 is part of a logical network 210 that includes the logical router 201 and two logical switches 202A and 202B. The two logical switches 202A and 202B each have VMs that connect to logical ports. While shown as VMs in these figures, it should be understood that other types of data compute nodes (e.g., containers, etc.) may connect to logical switches in some embodiments. The logical router 201 also includes two ports that connect to the external physical network 220. While shown with only one logical router, two logical switches, and four DCNs (VMs) in the logical network, a logical network may include any number of logical routers, switches, and DCNs. In some embodiments, logical router 201 may also be configured by a user to provide network services (e.g., load balancing, network address translation, etc.).

Logical routers (LRs) can be implemented in either a distributed manner (e.g., with the logical router processing performed in first-hop MFEs that physically couple directly to the data compute nodes) or a centralized manner (with the logical router processing performed in gateways for both north-south and east-west traffic). For centralized implementations, logical routers may be scaled out by using multiple physical boxes in order to provide additional throughput (e.g., using equal-cost multi-path (ECMP) techniques) as well as for failure protection. In some embodiments, the logical router is implemented as a distributed logical router connected to the DCNS and to a transit logical switch, with the transit logical switch connecting to a centralized logical router implemented by the gateway devices. This implementation is more fully described in U.S. Pat. No. 9,787,605 which is hereby incorporated by reference.

In some embodiments, the logical routers may only use stateful services if implemented at least partially in a centralized (e.g., clustered) manner (to avoid the need for state-sharing between the logical router implementations). In different embodiments, these gateways (that provide centralized aspects of logical routers, as well as which form the connection to the external network for distributed LRs) may be implemented as virtual machines (sometimes referred to as Edge VMs), in other types of data compute nodes (e.g., containers), or by using the Linux-based datapath development kit (DPDK) packet processing software (e.g., as a VRF in the DPDK-based datapath).

The gateway devices, in some embodiments, implement a same logical router that provides the stateful services. The logical router, in some embodiments, uses policy-based routing to redirect data messages received at a standby gateway device to the active gateway device. In some embodiments, the policy-based routing is used to determine that the received data message requires the stateful service. When redirecting the data message, some embodiments use a tunnel established between the two gateway devices. In some embodiments, the active gateway receives the data message as if it was from the external network instead of the standby gateway device.

Figure 3:
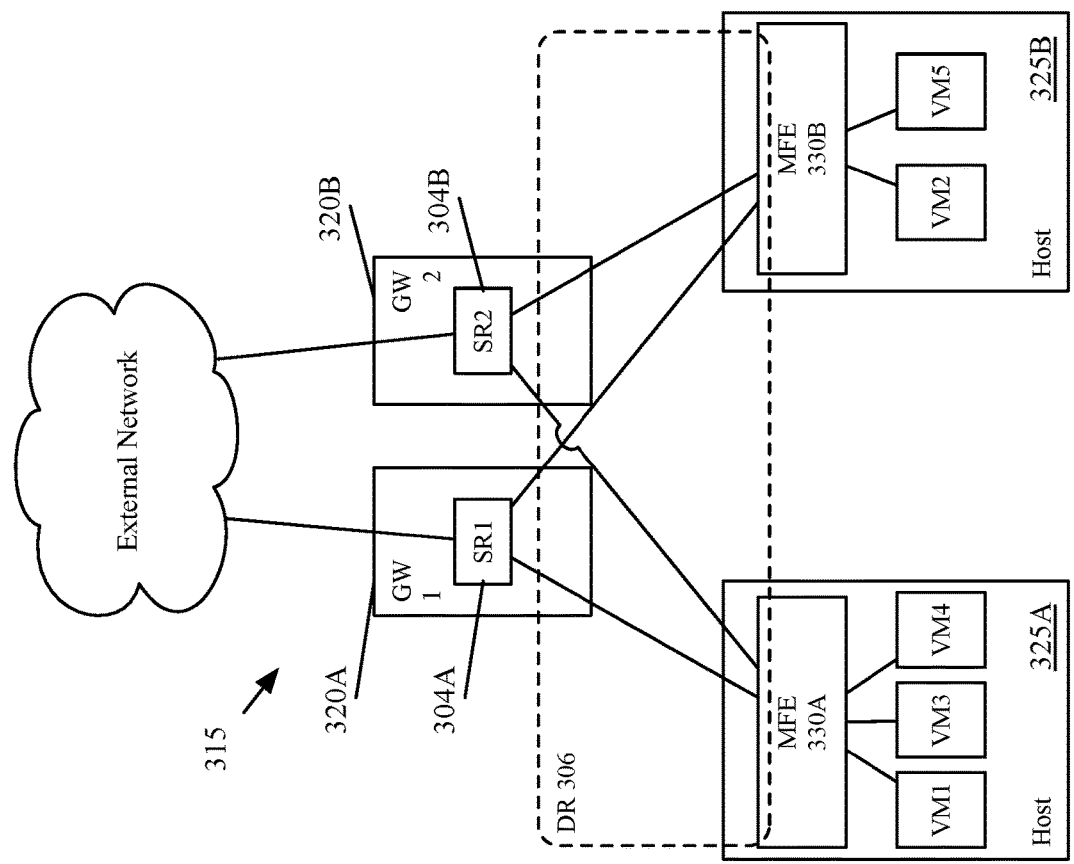
FIG. 3 conceptually illustrates a single-datacenter implementation of standby and active gateway devices for a software defined network.

FIG. 3 illustrates the physical distributed implementation of the logical network 210. Each of the VMs that couples to one of the logical switches 202A and 202B in the logical network 210 operates on a host machine 325. The MFEs 330 perform first-hop switching and routing for the logical switches 202A and 202B, and for the logical router 201 (implemented as distributed logical router 306). MFEs 330, in some embodiments, also perform switching and/or routing for other logical networks. As shown in FIG. 3, the distributed router 306 is implemented across the MFEs 330 as well as gateways 320. That is, the datapaths (e.g., in the MFEs 330, in a similar MFE in the gateways 320 or in a different form factor on the gateways) all include the necessary processing pipelines for the DR 306. Each MFE is capable of performing (logical) L2 processing for each logical switch and (logical) L3 processing for distributed routers and tunneling a data message to another host machine on which a destination DCN in the logical network executes. Further details of the data message processing of some embodiments are described in United States Patent Publication 2016/0226754, which is hereby incorporated by reference.

FIG. 3 also illustrates service routers (SRs) 304 executing in gateways 320 that are used in some embodiments to implement a provider logical router (PLR) or other centralized router to implement a component of the logical router that connects the logical network and the external network. Stateful services, in some embodiments, are provided only by centralized logical routers in order to maintain state information for data message flows without requiring state information exchange between each of the hosts executing a managed forwarding element implementing the logical router of the logical network. In some embodiments, the service routers 304 are redundant service routers that execute in an active-standby configuration in which a single service router is designated as the active service router that provides routing services (including stateful services) while the remainder of the service routers are designated as standby service routers in case the active service router fails. State information, in some embodiments, is provided to the standby service routers from the active service router in case the active service router fails. In some embodiments, the state information is updated periodically or upon certain events (e.g., a new flow beginning, a flow ending, etc.). The updates may be in the form of complete state information for all current flows or a difference from the last state information sent.

In the embodiment illustrated in FIG. 3, north-south traffic (i.e., traffic exchanged between the logical network and the external network) goes through one of the gateway devices 320. One of the gateways is designated as an active gateway that advertises the availability of IP addresses associated with the logical network with a lower cost than the standby gateways in order to direct traffic to the logical network, and specifically traffic requiring stateful services, to the forwarding element (e.g., SR or MFE) executing on the gateway for the forwarding element to provide the service. As described in relation to FIG. 1, traffic received by a standby gateway device is forwarded to an active gateway device in some instances.

Figure 4:
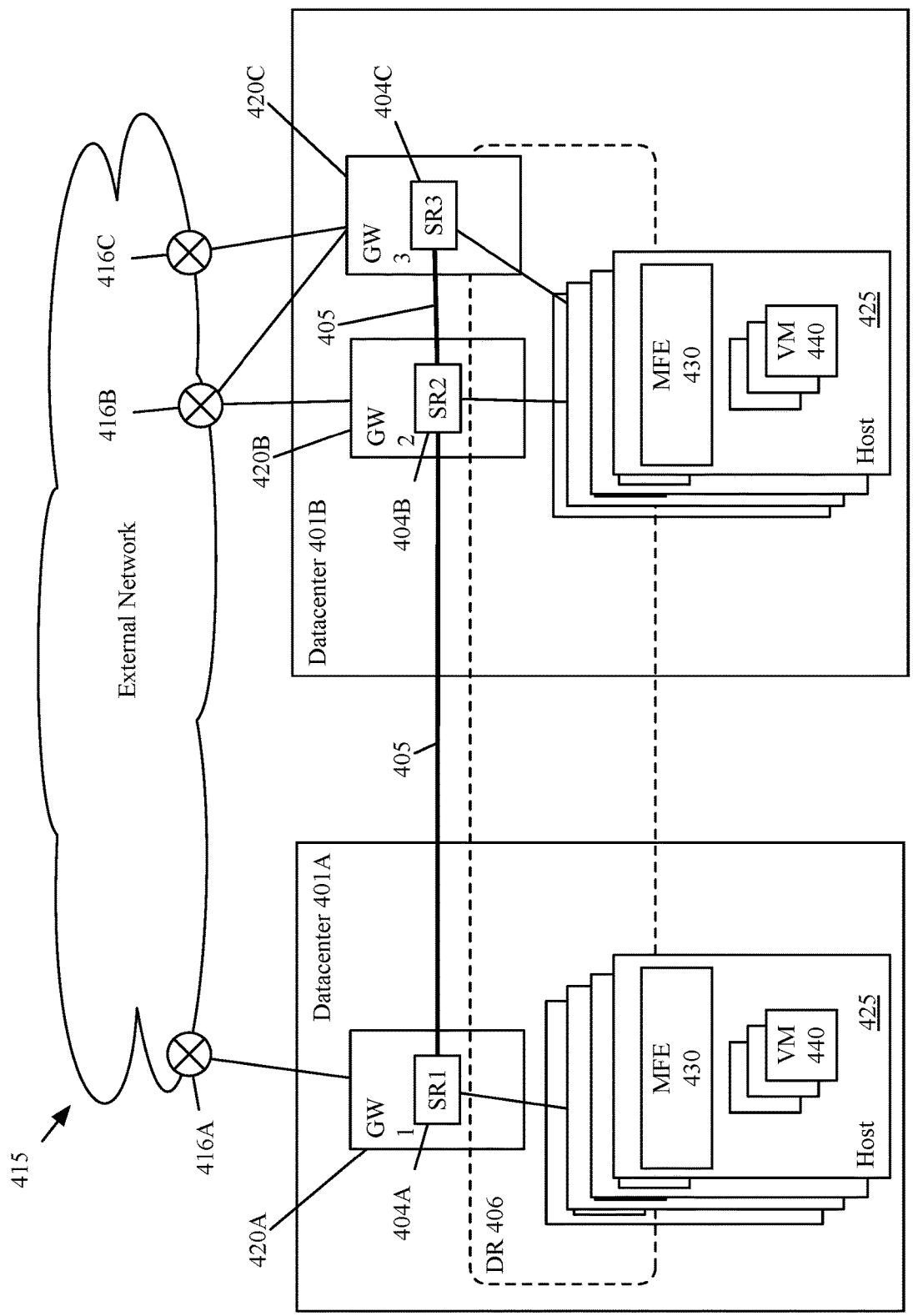
FIG. 4 conceptually illustrates a multi-datacenter implementation of standby and active gateway devices for a software defined network.

In some embodiments, the standby gateway device receives the traffic requiring the stateful service based on an asymmetry in the external network. The asymmetry, in some embodiments, is based on the placement of the standby gateway device at a datacenter in a different geographical location. FIG. 4 illustrates a multi-datacenter implementation of standby and active gateway devices for a software defined network.

FIG. 4 includes two datacenters 401, gateways 420 implementing service routers 404, tunnels 405 connecting gateway devices (e.g., service routers of gateway devices), a distributed router 406, sets of host machines 425 each executing sets of MFEs 430 and sets of VMs (or other data compute nodes) 440, and an external network 415. In some embodiments, the datacenters 401 are located at different physical locations to provide geo-redundancy or to reduce latency in communications with computing devices in external network 415 including routers 416. Each data center 401 has at least one gateway device 420 (e.g., a host machine executing a managed forwarding element) that connects to the external network, and the different gateway devices connect to different sets of forwarding elements of the external network (i.e., routers 416 at the edge of the external network).

FIG. 4 illustrates an embodiment in which active and standby gateways 420 are connected to an asymmetrical (from the perspective of the gateway devices) external network 415. External network 415 connects to the different gateway devices 420 through different sets of routers 416. Based on the different routers connected to the gateway devices, different gateway devices may be considered as the "closest" gateway for a computing device in the external network 415 communicating with a computing device (e.g., a VM 440) in the logical network. The standby gateway devices may be considered "closer" by the devices in the external network despite the standby gateway devices advertising the availability of the IP addresses with a higher cost. If, for example, gateway device 420B is designated as the active gateway, traffic from devices in external network 415 that are connected to routers 416A and 416C send traffic to devices in the logical network through gateway devices 420A and 420C respectively in some embodiments. As described in relation to FIG. 1 traffic requiring stateful services are forwarded to gateway device 420B for stateful processing.

Each datacenter includes a set of host machines 425, each host machine executing at least one managed forwarding element 430 implementing a forwarding element of the logical network (e.g., distributed router 406) and a set of data compute nodes (e.g., VMs 440) connected to the logical network. The gateway devices 420 in the datacenters, in some embodiments, are connected by tunnels 405. In some embodiments, the tunnels 405 connect the service routers 404 in the different gateway devices 420. Each gateway device, in some embodiments, connects to each other gateway device and may connect over multiple tunnels with a particular gateway device.

Figure 5:
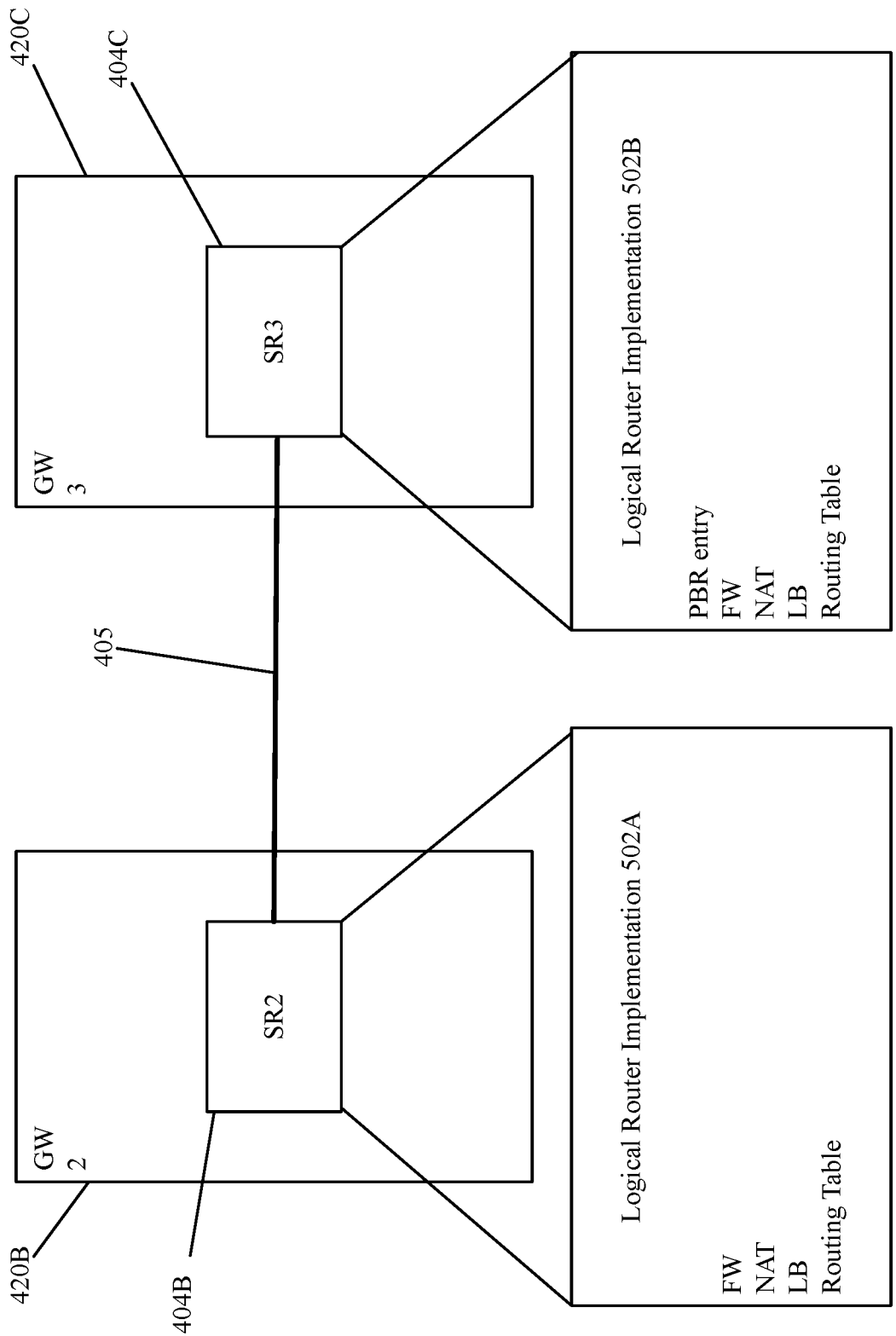
FIG. 5 conceptually illustrates a set of gateway devices in active-standby configuration implementing a logical router.

FIG. 5 conceptually illustrates a set of gateway devices in active-standby configuration implementing a logical router. FIG. 5 illustrates active and standby gateway devices (420B and 420C respectively) implementing a same logical router differently based on their different designation. As in FIG. 4, gateway device 420B is designated as an active gateway device and provides stateful services (i.e., a firewall (FW), network address translation (NAT), and load balancing (LB)) in addition to routing as part of implementing a logical router. Gateway device 420C is designated as a standby gateway device and also implements the same logical router providing the same stateful services, but the implementation of the logical router in the embodiment depicted in FIG. 5 includes an additional policy-based routing (PBR) entry that is processed before providing any of the stateful services or (logically) routing a received data message. The PBR entry indicates that the data message is to be forwarded to the active gateway device. In some embodiments, the routing (or forwarding) to the active gateway device is accomplished using route entries that take precedence over other route entries for routing and providing stateful services.

In some embodiments, the stateful services provided on the gateway device are not provided as part of the logical router, but are instead separate modules acting on the gateway device or on other devices. The logical router, in some embodiments, includes routing entries for IP addresses (e.g., virtual IP addresses) associated with the stateful services and, for standby gateway devices, the routing entries for the IP addresses associated with the stateful services are configured to forward or route the data message to the active gateway device. In other embodiments, routing entries for the IP addresses associated with the stateful services are equivalent in logical router implementations of active and standby gateway devices, but are superseded in standby gateway devices by other routing entries that direct the data message to the active gateway device.

Figure 6:
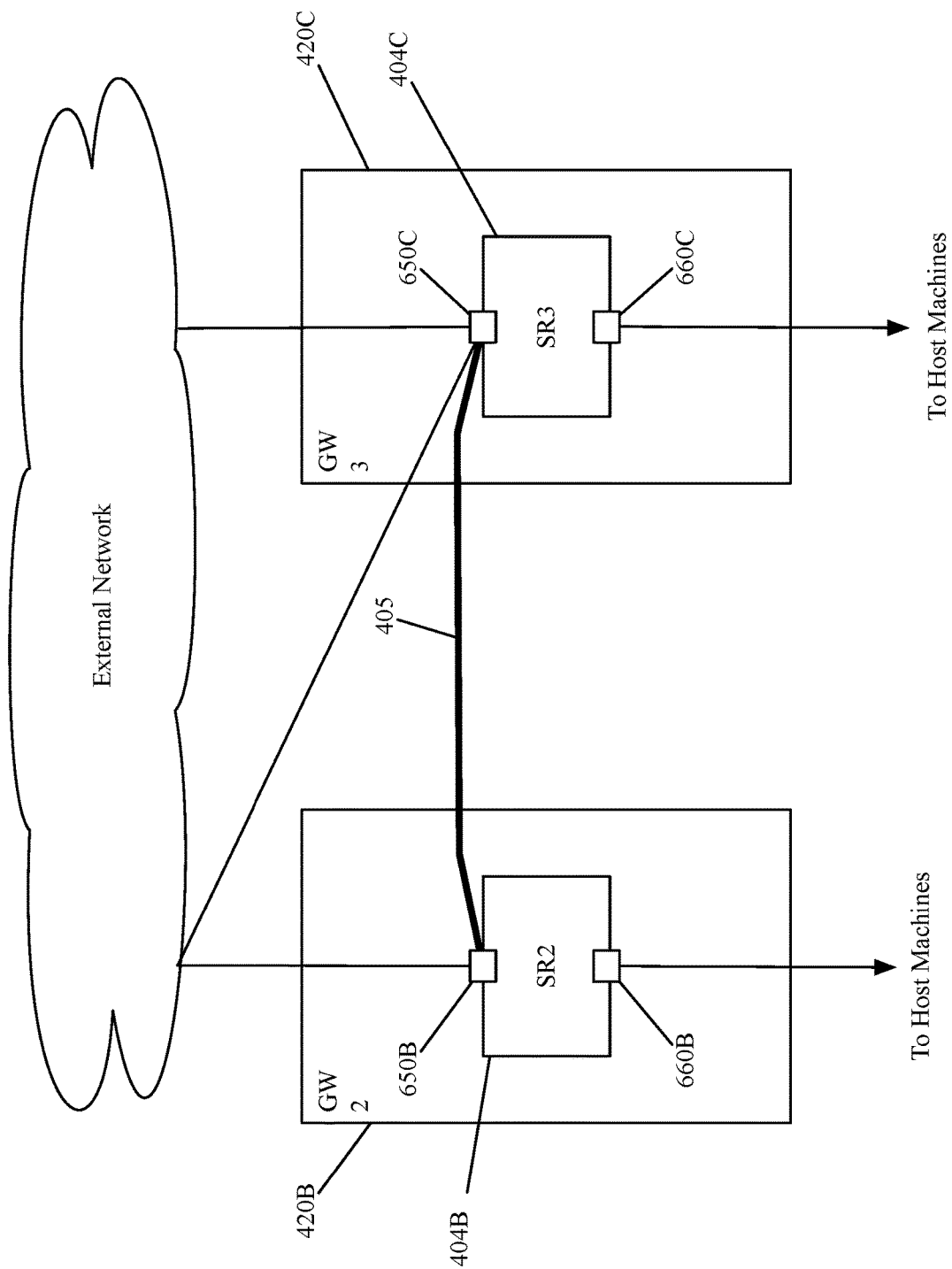
FIG. 6 conceptually illustrates a tunnel between gateway devices used to ensure that forwarded data messages appear to come from the external network.

FIG. 6 illustrates a tunnel 405 between uplink interfaces 650 of gateway devices 420B and 420C that is used in some embodiments to ensure that data messages received from the standby gateway device appear to come from the external network. By establishing tunnel 405 with the uplink interface 650 of the active gateway device 420B the data message appears to come from the external network. In some embodiments, tunnel 405 is established between uplink interface 650B and downlink 660C, but because the data message is received at uplink interface 650B, it appears to be coming from the external network. In some embodiments, an additional logical switch connected to the uplink interface of the logical router is introduced to allow the standby gateway device to send the data message to the active gateway device as a data message coming in to the logical network from the external network.

When an active gateway device fails, or is no longer the active gateway device for whatever reason, a gateway that was formerly a standby device becomes the active device. Once the newly-active device determines that it is the current active device, further messages received from the external network have the stateful service provided by the newly-active gateway device. As all the redirection happens within the software defined network, no restrictions or requirements are placed on the external networks.

Figure 7:
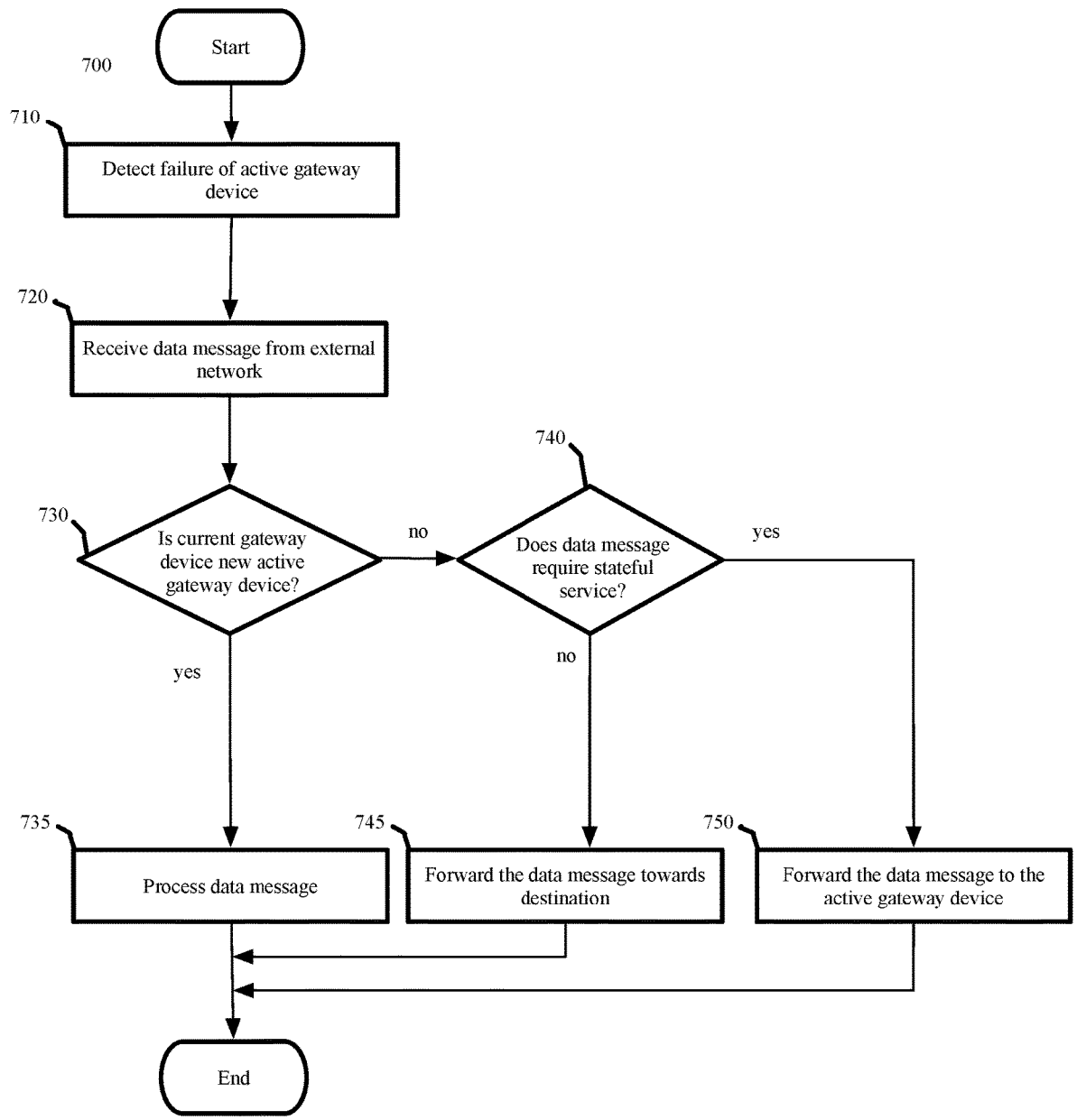
FIG. 7 conceptually illustrates a process for a standby gateway device to detect a failure of an active gateway and begin providing the stateful services if it is designated as the new active gateway device.

FIG. 7 conceptually illustrates a process 700 for a standby gateway device to detect a failure of an active gateway and begin providing the stateful services if it is designated as the new active gateway device. The process begins by detecting (at 710) a failure of an active gateway device. The failure in some embodiments is based on a failure of the host machine implementing the active gateway device. In some embodiments, failure of an active gateway device is based on the failure of a link to an external router.

The process continues by receiving (at 720) a data message from the external network. The data message, in some embodiments, is received based on the failure of the active gateway (e.g., an advertisement that the IP addresses of the logical network are no longer available at the formerly-active gateway device). In some embodiments, the data message is received based on an asymmetry in the external network as described in relation to FIG. 1.

After detecting the failure of the active gateway, the process determines (at 730) if the current gateway device is the new active gateway device or if it is still a standby device. This determination is shown as occurring after receiving the data message from the eternal network, but in some embodiments, and is independent of receiving the data message and may occur before receiving data messages from the external network. The determination, in some embodiments, is based on whether a control plane data message has been received from a network controller indicating that the gateway device is the new active gateway device.

If the process determines (at 730) that the current gateway device is the new active gateway device, the data message is processed by the gateway device and the process ends. If the process determines (at 730) that the gateway device is not the active gateway device, the process determines (at 740) whether the data message requires a stateful service.

If the process determines (at 740) that the data message does not require the stateful service, the process forwards (at 745) the data message towards the destination and the process ends. In some embodiments, the process forwards data messages that do not require a stateful service to the new active gateway device for the active gateway device to process. If the process determines (at 740) that the data message requires a stateful service, the process forwards (at 750) the data message to the active gateway device for the active gateway device to process and the process ends.

Figure 8:
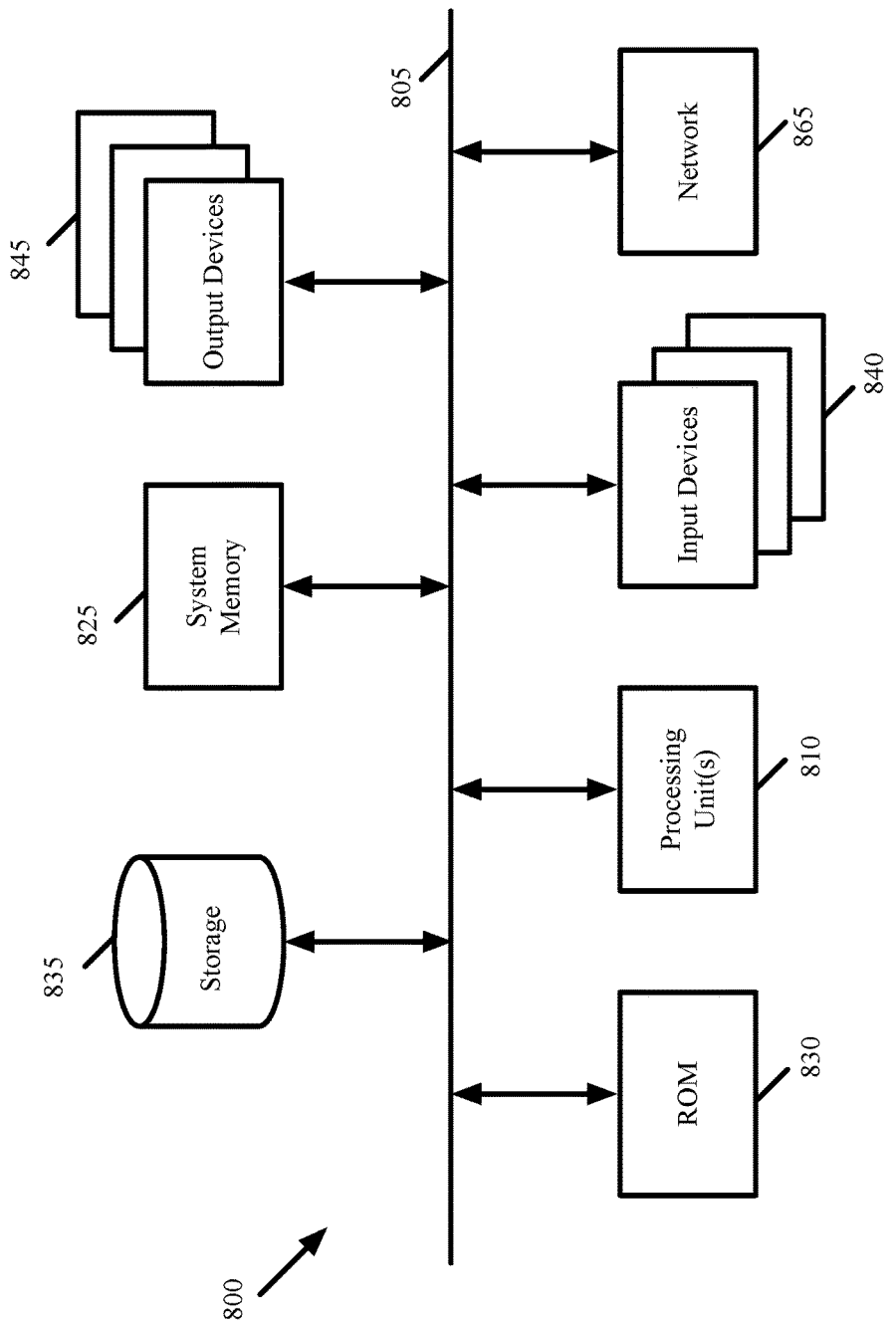
FIG. 8 conceptually illustrates an electronic system with which some embodiments of the invention are implemented.

FIG. 8 conceptually illustrates an electronic system 800 with which some embodiments of the invention are implemented. The electronic system 800 can be used to execute any of the control, virtualization, or operating system applications described above. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory (ROM) 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such as random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host machine using resources of the host machine virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 1 and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for ensuring that data messages requiring stateful processing are received at a gateway device storing state information, the method comprising:

using a first cost to advertise, from a first gateway device of a datacenter, an availability of a set of internet protocol (IP) addresses to an external network, the first cost being a higher cost than a second cost used by a second gateway device of the datacenter to advertise the availability of the set of IP addresses, said higher first cost used by the first gateway to direct data messages from the external network that need stateful processing to the second gateway device that stores state information for providing the stateful processing based on the lower second cost advertised by the second gateway, wherein the stateful processing comprises at least one of (i) a stateful load balancing service, (ii) a firewall service, and (iii) a virtual private network (VPN) service;

to redirect a particular data message from the external network that needs stateful services and that reaches the first gateway device despite the advertised higher first cost, performing a redirection operation comprising:

receiving the particular data message from the external network at the first gateway device directed to an IP address in the set of advertised IP addresses;

determining, based on a policy-based routing rule, that the received particular data message requires stateful processing provided at the second gateway device; and based on the determination, forwarding the received particular data message to an uplink interface of the second gateway device for the second gateway device to provide the stateful processing, wherein the uplink interface of the second gateway device connects to the external network.

2. The method of claim 1, wherein the first and second gateway devices are located in different datacenters.

3. The method of claim 1, wherein the data message is received at the first gateway device from the external network despite the higher advertised cost based on a physical proximity of a source of the data message to the first gateway device.

4. The method of claim 1, wherein the first and second gateway devices each implement a same logical router that provides the stateful processing.

5. The method of claim 1, wherein the policy based routing rule specifies at least one of a destination IP address, range of destination IP addresses, source media access control (MAC) address, source port, destination port, and protocol as criteria for requiring the stateful processing.

6. The method of claim 1, wherein no restrictions are placed on the external network to facilitate forwarding the received data message to the second gateway device.

7. The method of claim 1, wherein forwarding the received data message comprises forwarding the received data message over a tunnel between the first and second gateway devices.

8. The method of claim 1, wherein the first gateway device is a standby gateway device for data messages requiring stateful processing and an active gateway device for data messages not requiring stateful processing and the second gateway device is an active gateway device for data messages requiring stateful processing and for data messages not requiring stateful processing.

9. The method of claim 8, wherein the first gateway device forwards the received data message to the second gateway device based on a designation of the second gateway device as the active gateway device.

10. The method of claim 9, wherein the received particular data message is a first data message, the method further comprising, after a failure of the second gateway device:

determining that the first gateway device is currently designated as the active gateway;

receiving a second data message with a destination IP address in the set of advertised IP addresses that requires stateful processing; and providing the stateful processing for the received second data message.

11. A non-transitory computer readable medium storing a program for execution by a set of processing units, the program for ensuring that data messages requiring stateful processing are received at a gateway device storing state information, the program comprising sets of instructions for:
- advertising, from a first gateway device, an availability of a set of internet protocol (IP) addresses of an internal network to an external network, the first gateway device advertising the availability of the set of IP addresses with a higher cost than an availability for the same set of IP addresses advertised by a second gateway device;
- to redirect a first data message from the external network that needs stateful services and that reaches the first gateway device despite the advertised higher first cost:
  - receiving first data message from the external network at the first gateway device directed to an IP address in the set of advertised IP addresses;
  - using a policy-based routing rule to determine whether the received first data message requires stateful processing provided at the second gateway device;
  - after determining that the first data message requires stateful processing, forwarding the received first data message to an uplink interface of the second gateway device for the second gateway device to provide the stateful service, wherein the uplink interface of the second gateway device connects to the external network; and
- after determining that a second data message does not require stateful processing, processing the second data message for forwarding to a destination within the internal network.

12. The non-transitory computer readable medium of claim 11, wherein the first and second gateway devices are located in different datacenters.

13. The non-transitory computer readable medium of claim 11, wherein the first data message is received at the first gateway device from the external network despite the higher advertised cost based on a physical proximity of a source of the first data message to the first gateway device.

14. The non-transitory computer readable medium of claim 11, wherein the first and second gateway devices each implement a same logical router that provides the stateful processing.

15. The non-transitory computer readable medium of claim 11, wherein the policy based routing rule specifies at least one of a destination IP address, range of destination IP addresses, source media access control (MAC) address, source port, destination port, and protocol as criteria for requiring the stateful processing.

16. The non-transitory computer readable medium of claim 11, wherein no restrictions are placed on the external network to facilitate forwarding the received first data message to the second gateway device.

17. The non-transitory computer readable medium of claim 11, wherein the stateful processing is for at least one of a stateful load balancing service, a firewall service, and a network address translation (NAT) service.

18. The non-transitory computer readable medium of claim 11, wherein the first gateway device is a standby gateway device for data messages requiring stateful processing and an active gateway device for data messages not requiring stateful processing and the second gateway device is an active gateway device for data messages requiring stateful processing and for data messages not requiring stateful processing.

19. The non-transitory computer readable medium of claim 18, wherein the first gateway device forwards the received first data message to the second gateway device based on a designation of the second gateway device as the active gateway device.

20. The non-transitory computer readable medium of claim 19, the program further comprising sets of instructions for:
- determining that the first gateway device is currently designated as the active gateway;
- receiving a third data message with a destination IP address in the set of advertised IP addresses that requires stateful processing; and
- providing the stateful processing for the received third data message.

* * * * *